(12) United States Patent
Tarango et al.

(10) Patent No.: US 12,072,781 B2
(45) Date of Patent: Aug. 27, 2024

(54) METHODS AND APPARATUS FOR CONTINUOUS MONITORING OF TELEMETRY IN THE FIELD

(71) Applicant: Intel Corporation, Santa Clara, CA (US)

(72) Inventors: Joseph Tarango, Longmont, CO (US); Tyler Woods, Riverside, CA (US); Daniel Garces, Boca Raton, FL (US)

(73) Assignee: Intel Corporation, Santa Clara, CA (US)

( * ) Notice: Subject to any disclaimer, the term of this patent is extended or adjusted under 35 U.S.C. 154(b) by 732 days.

(21) Appl. No.: 17/133,483

(22) Filed: Dec. 23, 2020

(65) Prior Publication Data

US 2021/0191726 A1 Jun. 24, 2021

(51) Int. Cl.
| | | |
|---|---|---|
| *G06F 11/00* | (2006.01) |
| *G06F 9/4401* | (2018.01) |
| *G06F 9/445* | (2018.01) |
| *G06F 11/07* | (2006.01) |
| *G06F 11/30* | (2006.01) |
| *G06F 18/214* | (2023.01) |

(52) U.S. Cl.
CPC ........ *G06F 11/3006* (2013.01); *G06F 9/4411* (2013.01); *G06F 9/4451* (2013.01); *G06F 11/0793* (2013.01); *G06F 18/214* (2023.01)

(58) Field of Classification Search
CPC ............................ G06F 11/004; G06F 11/0793
USPC ....................................................... 714/1-57
See application file for complete search history.

(56) References Cited

U.S. PATENT DOCUMENTS

| | | | | |
|---|---|---|---|---|
| 10,795,593 B2 | 10/2020 | Tarango et al. | |
| 2002/0162049 A1* | 10/2002 | Takamoto | ........... G06F 11/1433 714/13 |
| 2008/0250265 A1* | 10/2008 | Chang | ................. H04L 41/0663 714/4.12 |
| 2009/0202147 A1* | 8/2009 | Sambongi | ........... G06F 16/5854 382/165 |
| 2010/0318837 A1* | 12/2010 | Murphy | ............... G06F 11/1461 714/E11.125 |
| 2011/0314331 A1* | 12/2011 | Beach | ................. G06F 11/0739 714/E11.029 |
| 2013/0198556 A1* | 8/2013 | Kolbet | ................... G06Q 10/20 714/2 |

(Continued)

OTHER PUBLICATIONS

Gottschlich et al., "The Three Pillars of Machine Programming," In Proceedings of the 2nd ACM SIGPLAN International Workshop on Machine Learning and Programming Languages (MAPL 2018). Association for Computing Machinery, New York, NY, 11 pages.

(Continued)

*Primary Examiner* — Sarai E Butler
(74) *Attorney, Agent, or Firm* — HANLEY, FLIGHT & ZIMMERMAN, LLC

(57) ABSTRACT

Methods, apparatus, systems and articles of manufacture for continuous monitoring of telemetry in the field are disclosed. An example apparatus includes a fault predictor to predict an outcome of one or more execution paths. A resolution handler is to determine one or more resolution strategies for an execution path and apply a resolution strategy. An impact trainer is to determine whether the predicted outcome of the execution path has changed and store impact data of one or more applied resolution strategies.

20 Claims, 15 Drawing Sheets

(56) References Cited

U.S. PATENT DOCUMENTS

| | | | | |
|---|---|---|---|---|
| 2016/0253710 | A1* | 9/2016 | Publicover | H04W 4/21 705/14.66 |
| 2018/0060159 | A1* | 3/2018 | Justin | G06F 11/0751 |
| 2019/0042128 | A1 | 2/2019 | Tarango | |
| 2019/0042129 | A1* | 2/2019 | Tarango | G06F 11/3034 |
| 2020/0301769 | A1* | 9/2020 | Bhandary | G06F 11/073 |
| 2021/0383206 | A1* | 12/2021 | Teppoeva | G06F 11/004 |

OTHER PUBLICATIONS

Diomidis Spinellis, "Modern Debugging: The Art of Finding a Needle in a Haystack," Communications of the ACM, vol. 61, Issue 11, Nov. 2018, 11 pages.

Intel, "Debugging on Intel® Platforms," Retrieved on Mar. 24, 2023, retrieved from: https://software.intel.com/en-us/articles/debugging-intel-platforms, 6 pages.

Vyukov, "Debugging Performance Issues in Go Programs," Intel Blog, May 10, 2014, Retrieved on Apr. 19, 2023, retrieved from https://software.intel.com/enus/blogs/2014/05/10/debugging-performance-issues-in-go-programs, 19 pages.

NVM Express, "NVMe Specifications Overview," Retrieved on Mar. 24, 2023, retrieved from: https://nvmexpress.org/specifications/, 4 pages.

Sane, "Telemetry: Customer Triage Use Cases for Intel SSDs," Wordpress, Oct. 31, 2018, Retrieved on Apr. 24, 2023, retrieved from: https://netmetic.wordpress.com/2018/10/31/telemetry-customer-triage-use-cases-for-intel-ssds/, 5 pages.

Eliyahu, "Telemetry: Enhancing Customer Triage of Intel SSDs," IT Peer Network, Oct. 25, 2018, Retrieved on Apr. 19, 2023, retrieved from: https://itpeernetwork.intel.com/telemetry-enhancing-customer-triage/, 4 pages.

Intel, "From Infrastructure Analysis to Scaling Out Telemetry, Let's Talk about OTP," Intel Blog, Retrieved on Mar. 24, 2023, from https://community.intel.com/t5/Blogs/ct-p/blogs/from-infrastructure-analysis-to-scaling-out-telemetry-lets-talk-about-otp#gs.qvjxut.

Browne, et al., "Closed Loop Automation—Telemetry Aware Scheduler for Service Healing and Platform Resilience," Intel Corporation, 2019, 10 pages.

Hilliker, "To Collect or Not Collect?" IT Peer Network, Nov. 21, 2018, Retrieved on Apr. 19, 2023, retrieved from https://itpeernetwork.intel.com/collect-or-not-collect/, 6 pages.

Hilliker, "Intel's Working Hard to Enable Your Data Center Transformation," IT Peer Network, Jan. 17, 2019, Retrieved on Apr. 19, 2023, retrieved from https://itpeernetwork.intel.com/data-center-transformation/, 6 pages.

Hilliker, "From Concept to Reality. So . . . Are you Ready to Rock on Telemetry?" IT Peer Network, Apr. 12, 2019, Retrieved on Apr. 19, 2023, retrieved from https://itpeernetwork.intel.com/from-concept-to-reality-so-are-you-ready-to-rock-on-telemetry/, 5 pages.

Intel, "Intel oneAPI Containers," GitHub Repository, Feb. 2, 2023, Retrieved on Mar. 24, 2023, from https://github.com/intel/oneapi-containers#readme, 5 pages.

Alam et al., "A Zero-Positive Learning Approach for Diagnosing Software Performance Regressions," 33rd Conference on Neural Information Processing Systems, NeurIPS, Vancouver, CA, dated Jan. 1, 2020, 13 pages.

Tarango et al., "Accelerating the Dynamic Time Warping Distance Measure using Logarithmic Arithmetic," 48th Asilomar Conference on Signals, Systems, and Computers (ASILOMAR-SSC), Pacific Grove, Ca, Nov. 2-5, 2014, 5 pages.

D. Sart, et al., "Accelerating Dynamic Time Warping Subsequence Search with GPUs and FPGAs," 2010 IEEE International Conference on Data Mining, Dec. 2010, 6 pages.

Yan Zhu, et al., "Matrix Profile IX: Admissible Time Series Motif Discovery with Missing Data," IEEE Transactions on Knowledge and Data Engineering, vol. 33, No. 6, Jun. 1, 2021, 11 pages.

Tarango et al., "Instruction Set Extensions for Dynamic Time Warping," International Conference on Hardware/Software Codesign and System Synthesis (CODES-ISSS), Montreal, Cananda, Oct. 4, 2013-Sep. 29, 2013, 10 pages.

Elman, "Finding Structure in Time," Cognitive Science, vol. 14, No. 2, 1990, 33 pages.

Hochreiter, et al., "Long Short-Term Memory," Neural Computation, vol. 9, No. 8, Nov. 1997, 46 pages.

NVM Express, "Standard Revision 1.3," NVM Express, Inc., May 1, 2017, 65 pages.

Texas Instruments, "JTAG/IEEE 1149.1 Design Considerations," Texas Instruments Advanced System Logic Products, 1996, 18 pages.

"Fractal," Wikipedia, downloaded from https://en.wikipedia.org/wiki/Fractal, on Mar. 24, 2023, 22 pages.

"Huffman Coding," Wikipedia, downloaded from https://en.wikipedia.org/wiki/Huffman_coding, on Mar. 24, 2023, 11 pages.

"Thunderbolt (Interface)," Wikipedia, downloaded from https://en.wikipedia.org/wiki/Thunderbolt_(interface), on Mar. 24, 2023, 28 pages.

Intel, "Closed-Loop Automation Solution for Enhancing 5G Services Availability using Telemetry Insight," Intel, 2022, 4 pages.

Github, "Intel/RAAD," Sep. 2, 2022, retrieved on Apr. 24, 2023, retrieved from: https://github.com/intel/raad, 7 pages.

* cited by examiner

METHODS AND APPARATUS FOR CONTINUOUS MONITORING OF TELEMETRY IN THE FIELD

FIELD OF THE DISCLOSURE

This disclosure relates generally to monitoring telemetry data, and, more particularly, to methods and apparatus for continuous monitoring of telemetry in the field.

BACKGROUND

To monitor client devices (e.g., computing devices) deployed in the field, telemetry data (e.g., information about the characteristics, operating status, resource utilization, location, etc.) may be collected. For example, telemetry data may be pulled (e.g., requested from a central or distributed location) or pushed (e.g., transmitted to a central or distributed location). Such telemetry data may be analyzed to detect a problem, to diagnose a problem, or for any other desired purpose.

Figure 1:
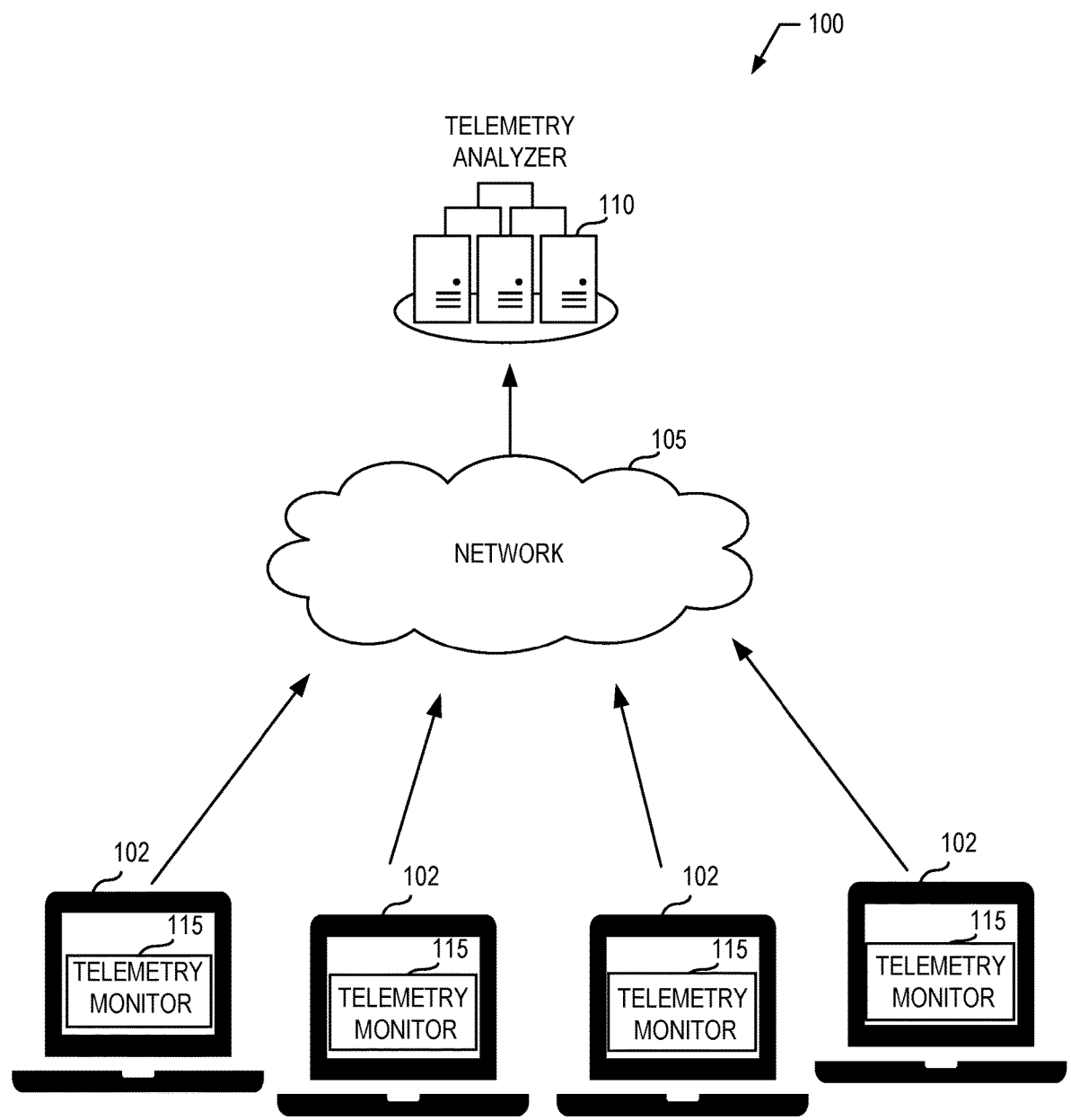
FIG. 1 is a block diagram illustrating an example environment in which telemetry data of one or more computing devices is monitored in accordance with teachings of this disclosure.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

When an issue occurs within a client device, organizations often take a reactive approach by attempting to identify a root cause of the issue and correct the root cause. With such an approach, organizations often lack access to data that will allow them to quickly resolve issues. In most cases, replication of the customer issue in-house is the only path to identifying the root cause, which is very resource-intensive. Methods and apparatus disclosed herein facilitate lightweight profiling and/or monitoring of telemetry data in the field.

In some previous solutions, when an example client device 102 would experience a performance issue or fault, the client device would report a signal through an example network to an example backend database, where the fault or performance issue would later be recreated and root cause analysis would be performed to determine how and why the issue occurred in the first place.

When an issue occurs within a client device, organizations often take a reactive approach by attempting to identify a root cause of the issue and correct the root cause. With such an approach, organizations often lack access to data that will allow them to quickly resolve issues. In most cases, replication of the customer issue in-house is the only path to identifying the root cause, which is very resource-intensive. Methods and apparatus disclosed herein facilitate lightweight profiling and/or monitoring of telemetry data in the field.

In example approaches disclosed herein, a telemetry monitor predicts outcomes of execution paths and determines a resolution strategy (e.g., a best resolution strategy) to be applied in an attempt to alter the predicted outcome of an execution path. An execution path represents source data inputs to the data output measurements hardware, firmware, or software module. An execution path in software is represented in a Control and Data Flow Graph (CFG-DFG) of the colored execution code and hardware modules. The scope of the modules allows for the artificial intelligence and machine learning network to partition the dependent and independent variables there for providing variable tuning scope. The variable tuning scope allows for learned corrective re-configuration and procedure sequences such that the solution space can be explored for tailored optimized solutions based on the device state. The tuning can be scoped with software or hardware path self-mutating reconfigurable behaviors. For example, if the predicted outcome of an execution path were to be a fault (e.g., a negative outcome, an anomaly, etc.), the telemetry monitor could apply one or more resolution strategies in an attempt to change the predicted outcome to not be a fault. For example, a fault can include any outcome of an execution path that decreases or impedes performance of a client device or has a negative outcome (e.g., an execution path that leads to a CPU, GPU, FPGA, compute accelerator, or Storage Solid State Drive (SSD) overheating, or an execution path that causes a certain application to stop responding, etc.).

Example approaches disclosed herein allow host systems to take proactive actions to mitigate current and/or future anomalous behaviors. Some example approaches allow for machine-learning of data signatures within collected telemetry data, which allows systems to find and/or save unique signatures, cluster behaviors, predict sequences, and learn the best intervention strategy for a given control parameter set. Systems that use the invention disclosed herein spend less resources replicating customer issues and accessing customer data. The forward prediction sequence is bijectivity used on Meta data to reverse forecast dependent and independent variables labeling the software, firmware, and hardware modules such that the anomalous CFG-CFG meta labeled within a set scope for the outcome.

FIG. 1 is a block diagram of an example environment 100, which includes several example client devices 102 connected to an example network 105 and an example telemetry analyzer 110 to analyze telemetry data from the example client devices. To record telemetry data, one or more of the example client or enterprise devices 102 include an example telemetry monitor 114.

The example client device 102 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reconfigurable architecture (CGRA(s)), image signal processor(s) (ISP(s)), Graphics Processing Units (GPUs), and Central Processing Units (CPUs), micro-processors, etc.

The example client device 102 generates telemetry data (e.g., application data, system data, etc.) that can be monitored and collected. In this example, the client device 102 communicates with the example backend server 110 through the example network 105. However, the client device 102 could communicate to the backend server 110 directly, aggregate node, and/or in any other manner.

The example network 105 communicatively couples the example client device 102 to the example telemetry analyzer 110. The example network 105 of the illustrated example of FIG. 1 is implemented by one or more web services, cloud services, virtual private networks (VPN), local area networks (LAN), Ethernet connections, 1 to 5G Cellular or Satellite Networks, the internet, or any other means for communicating or relaying data. In the illustrated environment 100, multiple example client devices 102 use the same example network 105 to communicate to the telemetry analyzer 110. In some examples, multiple client devices may use any combination of networks to communicate data to the example telemetry analyzer 110.

The example telemetry analyzer 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reconfigurable architecture (CGRA(s)), image signal processor(s) (ISP(s)), etc. In the example telemetry monitoring system 100, one or more of the client devices, such as the example client device 102, communicate telemetry data to the telemetry analyzer 110 to predict and intervene negative outcome execution paths. In the illustrated example of FIG. 1, client devices deliver telemetry data to the telemetry analyzer 110 through an example network 105. In some examples, the example telemetry analyzer 110 may receive data directly from an example client device 102.

The example telemetry monitor 115 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reconfigurable architecture (CGRA(s)), image signal processor(s) (ISP(s)), etc. Furthermore, the data communicated by the example telemetry monitor 115 may be in any data format such as, for example, binary data, comma delimited data, tab delimited data, structured query language (SQL) structures, dynamic self-describing structures, etc.

In operation, the example client device 102 generates system and application data reported by the example telemetry monitor 115 and is collected and monitored by the example telemetry analyzer 110. Upon prediction of a fault, the example telemetry analyzer 110 interrupts the execution path of the example client device 102 to apply intervention strategies to change the predicted outcome of the execution path. In this example, the example client devices are connected to the example network 105 and, thereby, communicatively coupled to the telemetry analyzer 110. In examples disclosed herein, upon the occurrence of a fault, data is communicated (e.g., by the telemetry monitor 115) from the example client device 102 through the example network 105 to the example telemetry analyzer 110 for triage analysis. In some examples, the triage analysis may occur within the example client device.

Figure 2:
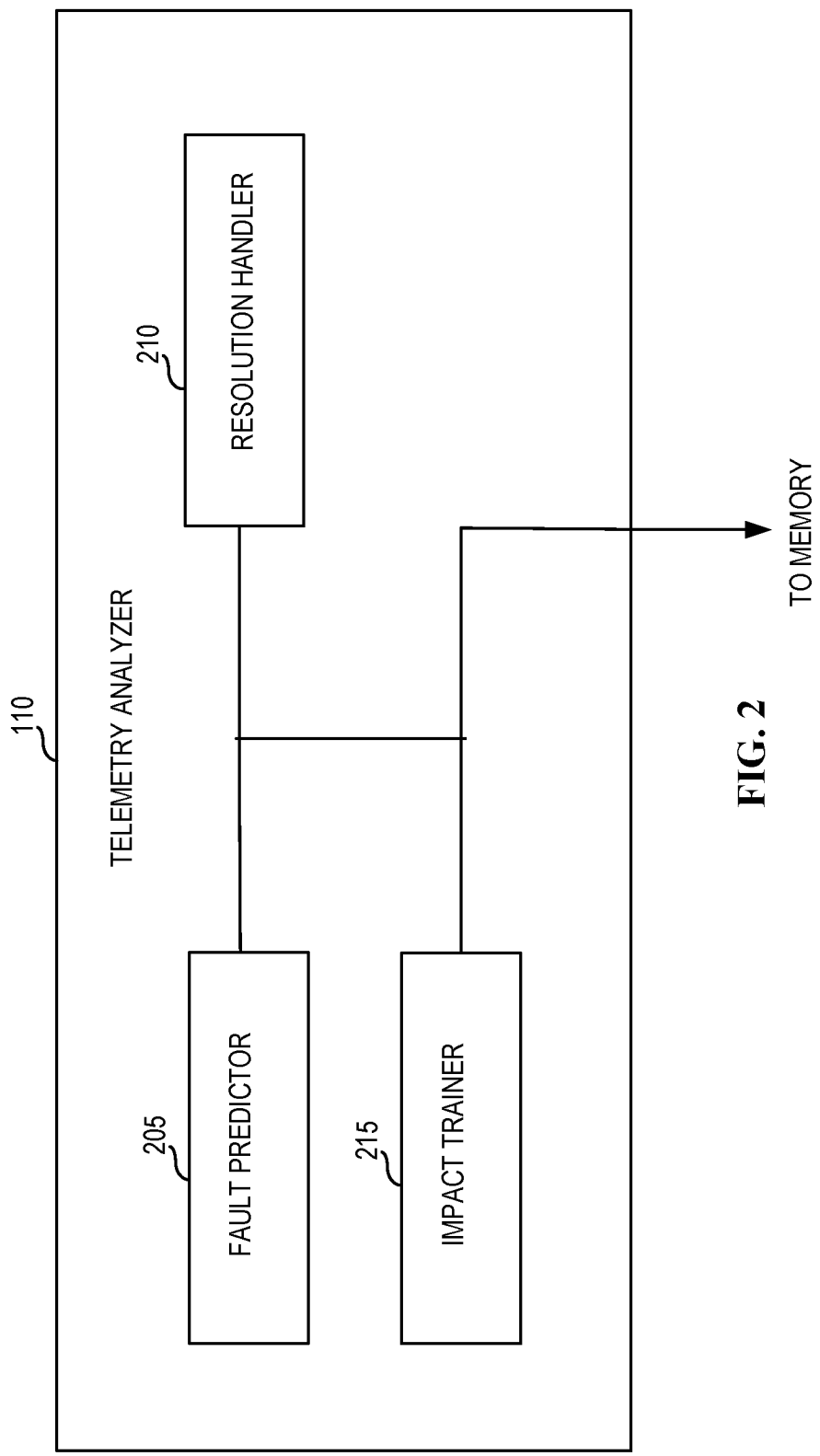
FIG. 2 is a block diagram of an example implementation of the telemetry monitor of FIG. 1.
Figure 4:
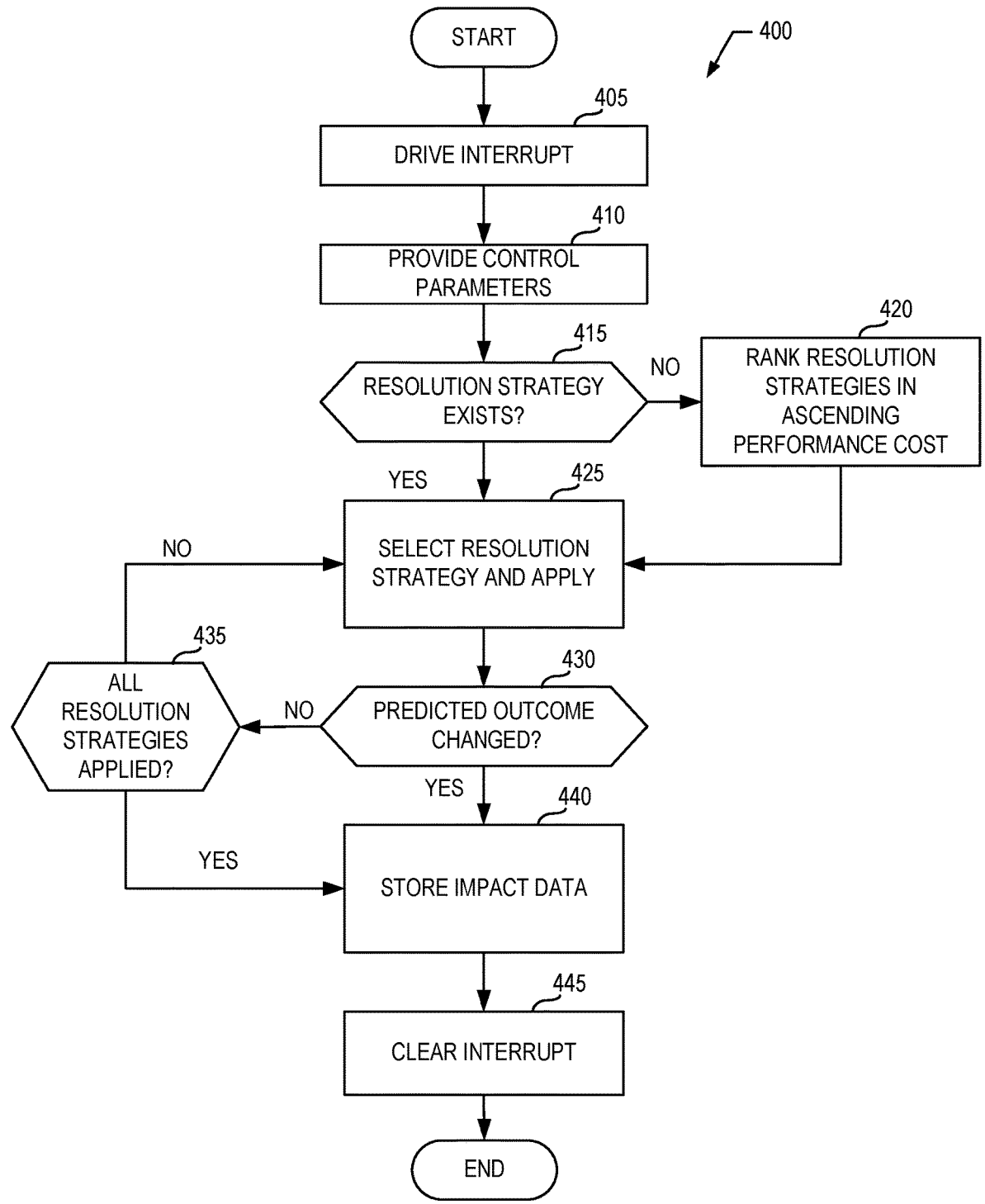
FIGS. 4-7E are flowcharts representative of machine-readable instructions which may be executed to implement the telemetry monitor of FIG. 1, FIG. 2, and/or FIG. 3.

A flowchart representative of example hardware logic, machine readable instructions, hardware implemented state machines, and/or any combination thereof for implementing the example telemetry analyzer 110 of FIGS. 1-2 is shown in FIG. 4. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 4, many other methods of implementing the example telemetry analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), configuration hardware bit stream, an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 2 is a block diagram of an example implementation of the example telemetry analyzer 110 of FIG. 1. The example telemetry analyzer 110 of FIG. 2. includes an example fault predictor 205, an example resolution handler 210, and an example impact trainer 215.

The example fault predictor 205 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reconfigurable architecture (CGRA(s)), image signal processor(s) (ISP(s)), etc. The example fault predictor 205 characterizes and predicts outcomes of execution paths and intervenes when a negative outcome or fault is predicted. In this example, the data characterized and monitored by the example fault predictor 205 is stored in the example database 334 and later referenced by the example fault predictor 205 to determine the outcome of an execution path or state of a device. In some embodiments, the example fault predictor 205 references instructions 1032 stored within the example database 334 to reference parameters than indicate an execution path results in a fault or parameters that describe the state of the device. In the event that a fault is predicted, the example fault predictor 205 outputs an interrupt to interrupt the execution path, and sends the relevant parameters including the predicted fault meta data and profile to the example resolution handler 210. In this example, the interrupt is a signal but could additionally or alternatively be a flag, data value, register setting, etc.

The example resolution handler 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example resolution handler 210 determines the best resolution strategy for the predicted fault. If the given fault has a resolution strategy, then the resolution handler 210 applies that resolution strategy. If the predicted fault does not have a resolution strategy, the resolution handler 210 assembles a list of resolution strategies from the example database 334, listed in ascending cost to the performance of the system. The example resolution handler 210 applies the lowest cost resolution strategy first, and if that strategy is unsuccessful in changing the outcome of the path from being a fault, then the example resolution handler 210 applies the next lowest cost resolution strategy. The goal of the example resolution handler 210 is to attempt all possible resolution strategies to change the prediction of the execution path from being a fault to not being a fault.

The example impact trainer 215 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc.

The example impact trainer 215 notifies the client device of the result of the one or more attempted resolution policies, regardless of whether or not they were successful in changing the predicted outcome or not, and saves the impact data from the attempted policies to the example database 334. In the examples disclosed herein, the impact data includes the outcome of each resolution strategy, how each strategy affected the predicted outcome of the execution path, meta data and profiles associated with each resolution strategy, and how to integrate the results of the resolution strategy applications to future execution paths. In general, the impact data is saved in the example database 334 to improve the prediction and intervention capabilities of the system for future similar execution paths. After the impact data is reported and saved to the example database 334, the example fault predictor clears the interrupt and the system continues execution.

While an example manner of implementing the telemetry monitor of FIG. 1 is illustrated in FIG. 2, one or more of the elements, processes and/or devices illustrated in FIG. 2 may be combined, divided, re-arranged, omitted, eliminated and/or implemented in any other way. Further, the example fault predictor 205, the example resolution handler 210, the example impact trainer 215 and/or, more generally, the example telemetry monitor of FIG. 1 may be implemented by hardware, software, firmware and/or any combination of hardware, software and/or firmware. Thus, for example, any of the example fault predictor 205, the example resolution handler 210, the example impact trainer 215 and/or, more generally, the example telemetry analyzer 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example fault predictor 205, the example resolution handler 210, the example impact trainer 215 is/are hereby expressly defined to include a non-transitory computer readable storage device or storage disk such as a memory, a digital versatile disk (DVD), a compact disk (CD), a Blu-ray disk, etc. including the software and/or firmware. Further still, the example telemetry analyzer 110 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
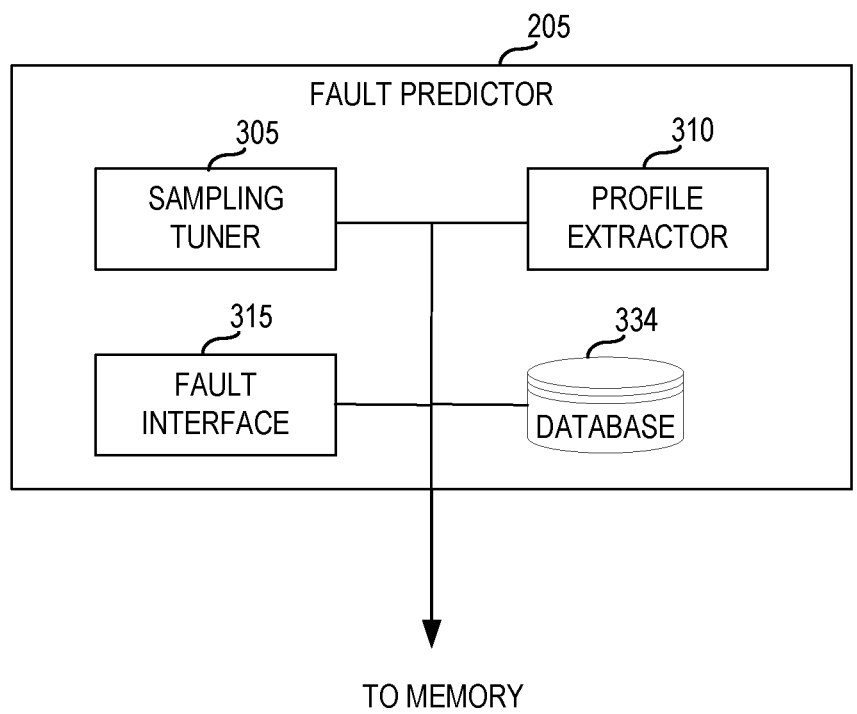
FIG. 3 is a block diagram of an example implementation of the fault predictor of FIG. 2.

FIG. 3 is a block diagram of an example implementation of the example fault predictor 205 of FIG. 2. The example fault predictor 205 of FIG. 3 includes an example sampling tuner 305, an example profile extractor 310, and an example database 334.

The example sampling tuner 305 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example sampling tuner 305 determines an optimized rate for data collection and characterization and ensures that all telemetry variables are observable. By analyzing the changing variables and velocity of sampled data, the example sampling tuner 305 generates a sampling rate to be used by the example fault predictor 205 to further sample and profile telemetry data.

The example profile extractor 310 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example profile extractor 310 profiles meta data through the use of fractal similarity searches and extracts data profiles to predict the outcome of execution paths. The example profile extractor searches an example database 334 for similar profiles and subsequences that match the recorded telemetry data points to create a growing database of profiles and subsequences. This growing database improves the prediction capabilities of the example fault predictor 205. In this example, the example profile extractor 310 uses fractal similarity searches to match existing profiles to the extracted profile and improve existing profiles. The example profile extractor 310 constantly extracts data profiles from meta data to be used in the characterization of data done by the overall process of the example fault predictor 205.

The example fault interface 315 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example fault interface 315 determines if a system fault has occurred and initiates triage to generate parameters for the fault conditions if a fault has occurred. In some examples, the fault interface 315 reports the generated parameters to a backend server for triage analysis.

The example database 334 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example database 334 may be in any data format such as, for example, binary data, comma delimited data, tab delimited data, structured query language (SQL) structures, binary hardware aging/health characterization bit streams, etc. While, in the illustrated example, the database 334 is illustrated as a single device, the example database 334 and/or any other data storage devices described herein may be implemented by any number and/or type(s) of memories. In the illustrated example of FIG. 3, the example database 334 stores meta data profiles, signatures, collected telemetry data, resolution strategies, and/or impact data.

While an example manner of implementing the example fault predictor 205 of FIG. 2 is illustrated in FIG. 3, one or more of the elements, processes and/or devices illustrated in FIG. 3 may be combined, divided, re-arranged, omitted, eliminated and/or implemented in any other way. Further, the example sampling tuner 305, the example profile extractor 310, the example database 334 and/or, more generally, the example fault predictor 205 of FIG. 2 may be implemented by hardware, software, firmware and/or any combination of hardware, software and/or firmware. Thus, for example, any of the example sampling tuner 305, the example profile extractor 310, the example database 334 and/or, more generally, the example fault predictor 205 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sampling tuner 305, the example profile extractor 310, the example database 334 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fault predictor of FIG. 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example telemetry analyzer 110 of FIGS. 1-3 is shown in FIGS. 4-7E. The machine-readable instructions may be one or more executable programs or portion(s) of an executable program for execution by a computer processor and/or processor circuitry, such as the processor 1012 shown in the example processor platform 1000 discussed below in connection with FIG. 10 and FIG. 11. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 4-7E, many other methods of implementing the example telemetry analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-7E may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions 400 that may be executed to implement the example telemetry analyzer 110 to continuously monitor telemetry. The example process 400 of FIG. 4 begins when the example fault predictor 205 predicts a fault and drives an interrupt. (Block 405). In this example, the fault predictor 205 predicts the outcomes of execution paths by referencing instructions within in the example database 334 that indicate traces of previous faults or negative outcomes. These instructions may include timeseries system data, application data, or any other type of data relative to a client device that could be monitored and referenced to match a current execution path to an execution path that results in a fault or negative outcome.

The example fault predictor 205 then provides a set of control parameters based on the predicted outcome of the execution path to the example resolution handler 210. (Block 410). The parameters include, but are not limited to, vectors of resolution policies and predicted fault meta data and signatures. In more general terms, these parameters are tailored to the current execution path of the system. The example resolution handler 210 receives these parameters and determines if a resolution strategy exists for the provided set of parameters. (Block 415). If the resolution handler 210 determines that a resolution strategy does not exist for the set of parameters provided (e.g., block 415 returns a result of NO), then the resolution handler 210 creates a ranked list of resolution strategies in order of ascending performance cost. (Block 420). In this example, the ranked list is in ascending performance cost order. However, any other method for ranking resolution strategies could additionally or alternatively be used. After ranking the resolution strategies, the resolution handler 210 applies the resolution strategy first in the ranked list. (Block 425). If the resolution handler 210 determines that a resolution strategy exists for the set of parameters (e.g., block 415 returns a result of YES), then the resolution handler 210 applies the existing resolution strategy. (Block 425).

After the resolution handler 210 applies the corresponding resolution strategy, the example impact trainer 215 determines if the predicted outcome of the execution path has changed. (Block 430). If the predicted outcome of the execution path has changed (e.g., block 430 returns a result of YES), then the impact trainer 215 notifies the client of the state change and saves the impact data. (Block 440). If the predicted outcome of the execution path has not changed (e.g., block 430 returns a result of NO), the impact trainer 215 then determines if all resolution strategies have been applied. (Block 435). If there are resolution strategies that have not been applied yet (e.g., block 435 returns a result of NO), the example resolution handler 210 selects the next resolution strategy in the ranked list and applies it. If all resolution strategies have been applied (e.g., block 435 returns a result of YES), then the impact trainer 215 notifies the client of the state change and saves the impact data. (Block 440). In some examples, the impact data links the resolution strategy to the signature match. In response to the example impact trainer 215 to notifying the client of the state change and saving the impact data, the example fault predictor 205 then clears the interrupt. (Block 445).

Figure 5:
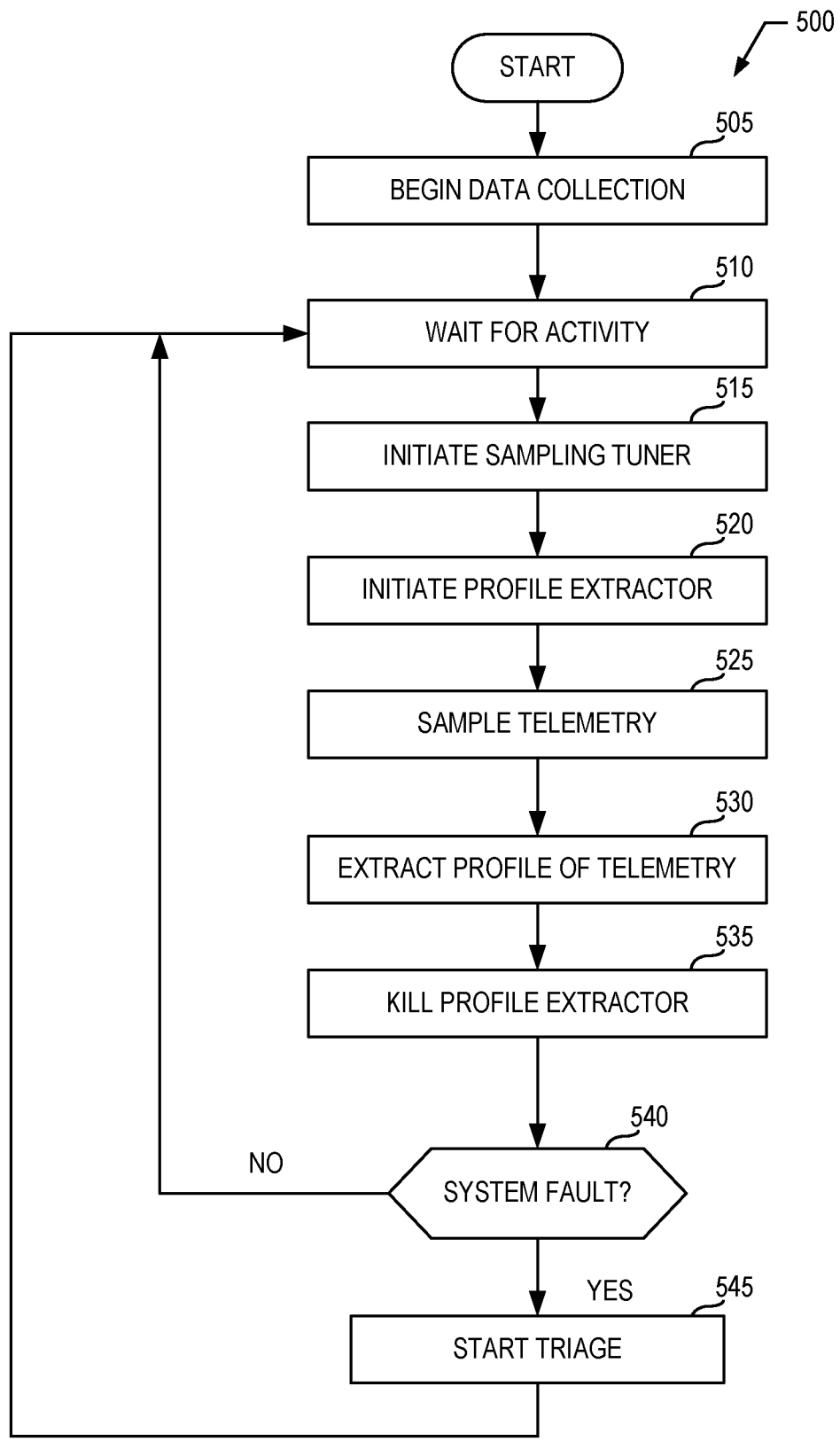

FIG. 5 is a flowchart representative of example machine readable instructions 500 that, when executed, implement the fault predictor 205 to characterize telemetry data. The example process 500 of the illustrated example of FIG. 5 begins when the example fault predictor 205 is initialized to start data collection. (Block 505).

The example fault predictor 205 then waits for activity. (Block 510). Upon detection of telemetry activity, the example sampling tuner 305 is initiated. (Block 515). In examples discloses herein, initiating the example sampling tuner 305 begins an observation phase to understand the changing variables, velocity, and appropriate frequency for data collection. In some examples, the sampling tuner 305 is initiated by a request from the client device.

Then the example profile extractor 310 is initiated. (Block 520). In examples disclosed herein, initiating the example profile extractor 310 begins an execution of the meta data profile to profile the collected data. In some examples, the profile extractor 310 is initiated by a request from the client device. The example profile extractor 310 begins to sample and record telemetry data at the sampling frequency determined by the sampling tuner 305. (Block 525). In examples disclosed herein, the sampling frequency is determined by the sampling tuner 305. However, any other approach to determine the sampling frequency may be additionally or alternatively used. In examples disclosed herein, the telemetry data sampled may be a given data object or several data objects.

The example profile extractor 310 extracts the telemetry profile, the telemetry profile containing the meta data profile of the sampled telemetry data. (Block 530). After the meta data profile has been extracted, the execution of the profile extractor 310 is terminated. (Block 535). The example fault interface 315 then determines if a system fault has occurred. (Block 540). In some examples, a system header check of the telemetry payload to understand if the device is in fault mode is used. In some examples, telemetry can also send a controller-initiated event with the fault mode which would be used to determine a fault. If a fault has occurred (e.g., block 540 returns a result of YES), the fault interface 315 initiates triage to generate parameters for the fault conditions. (Block 545). The fault predictor 205 then returns to block 510 and waits for activity. If a fault has not occurred (e.g., block 540 returns a result of NO), then the fault predictor 205 returns to block 510 and waits for activity.

Figure 6:
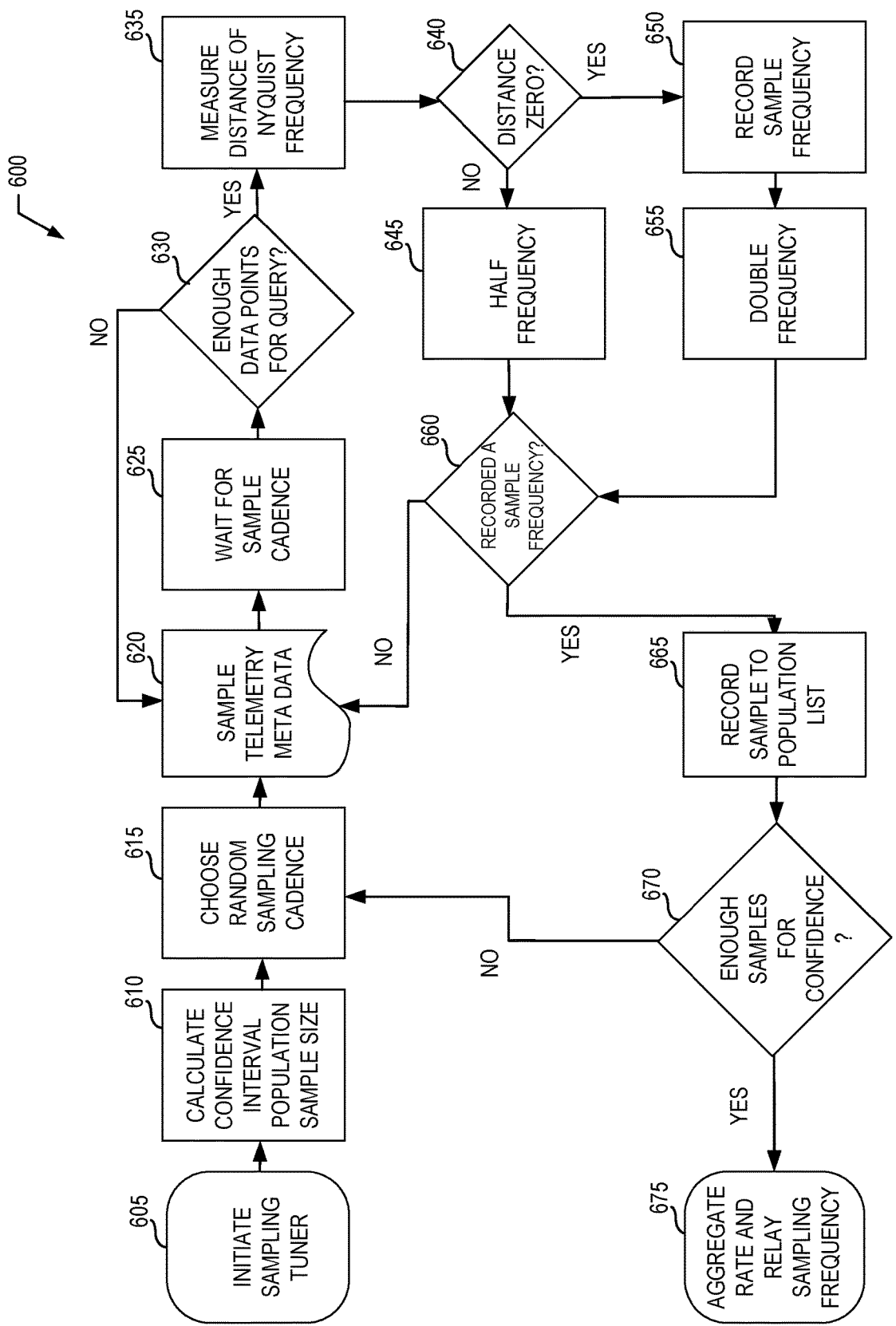
Figure 7A:
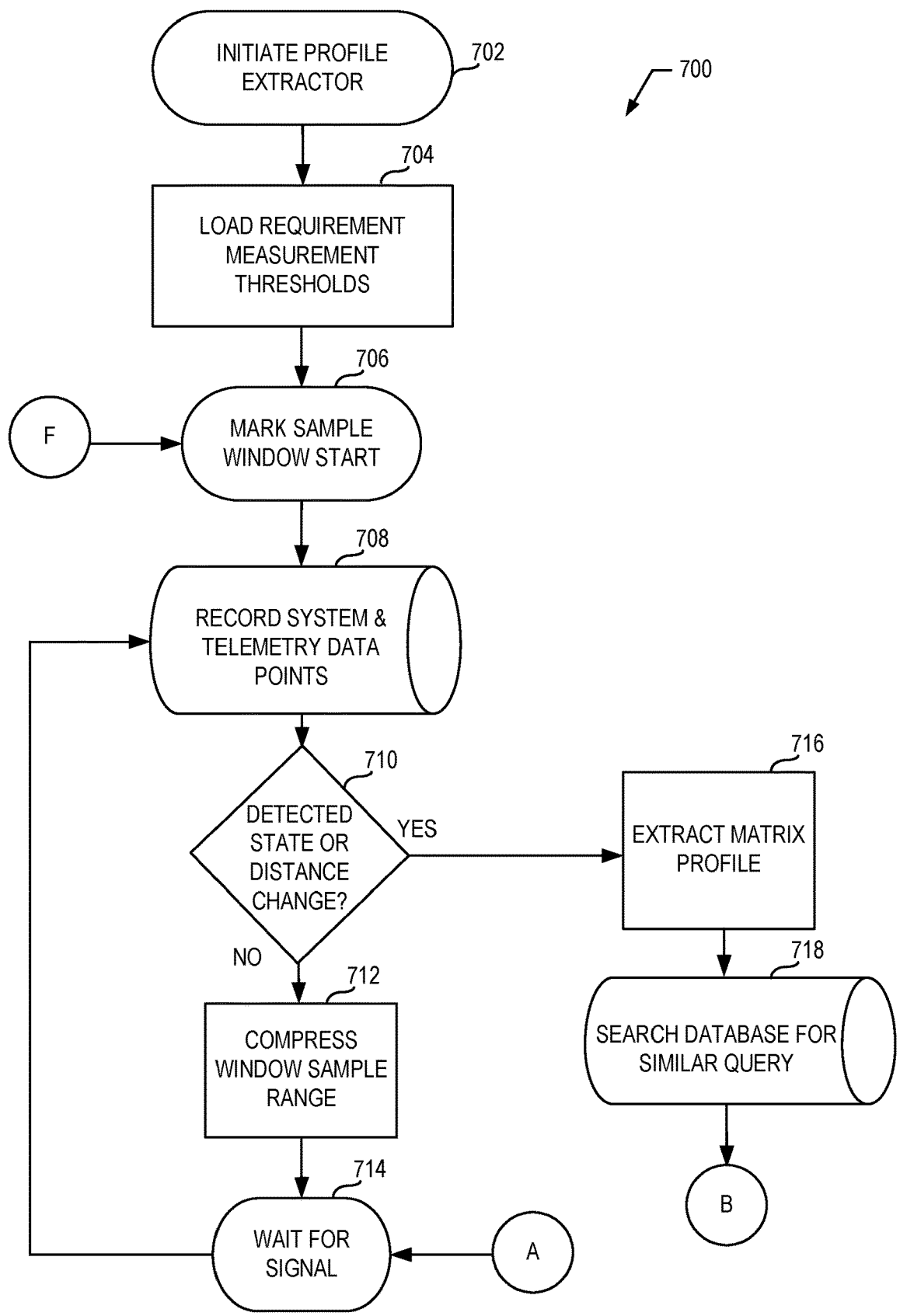
Figure 7B:
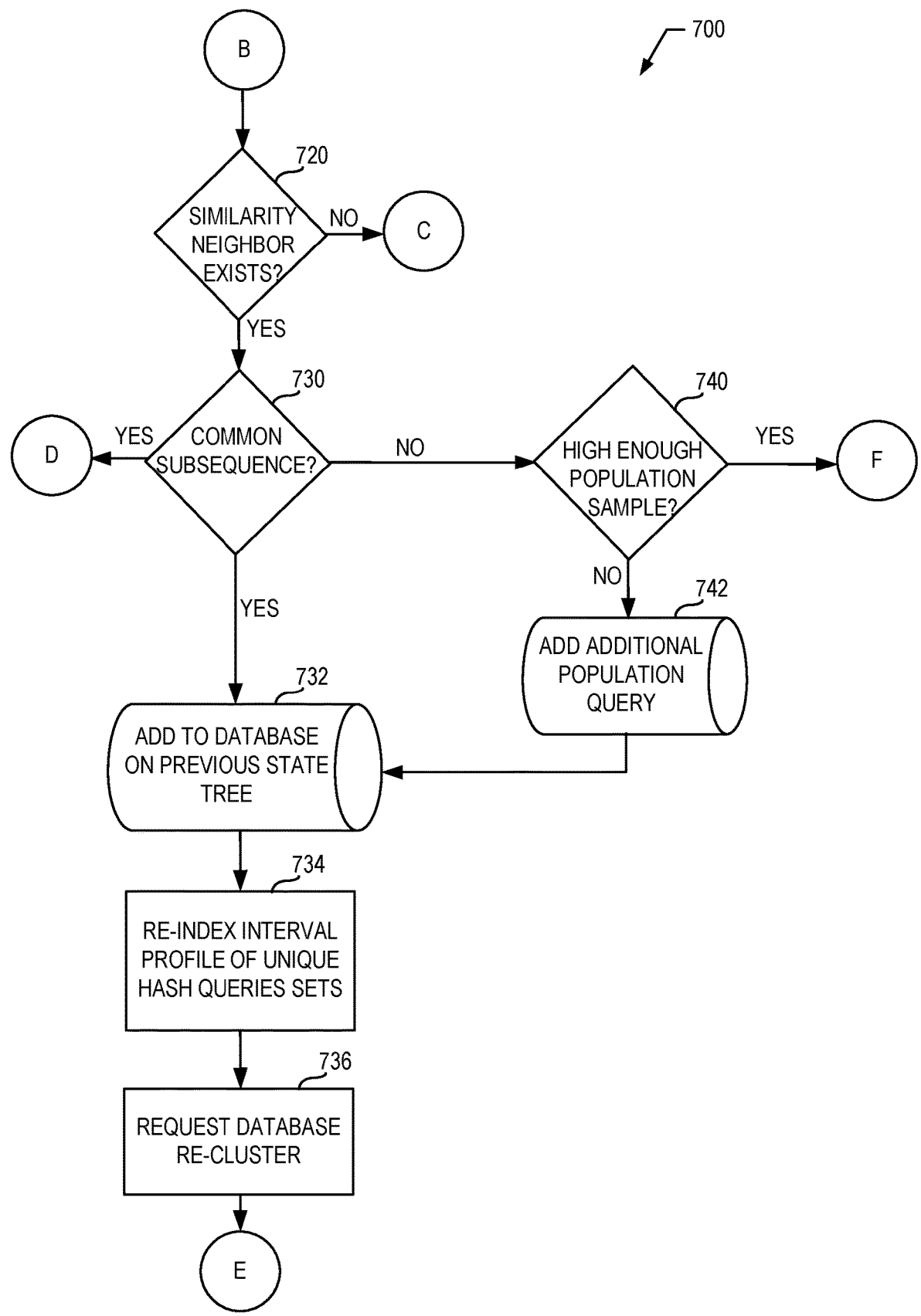
Figure 7C:
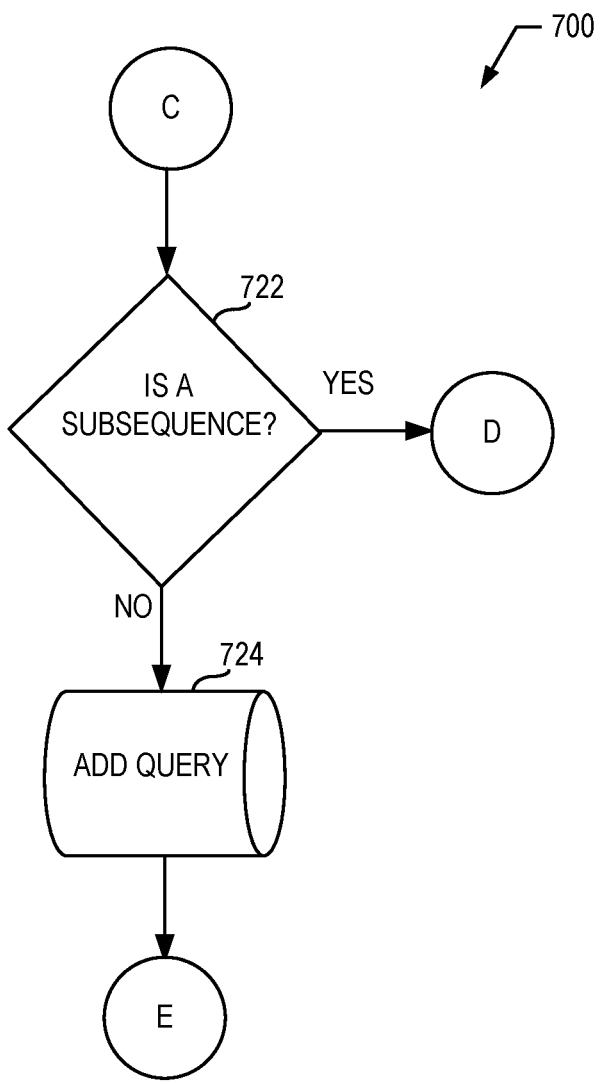
Figure 7D:
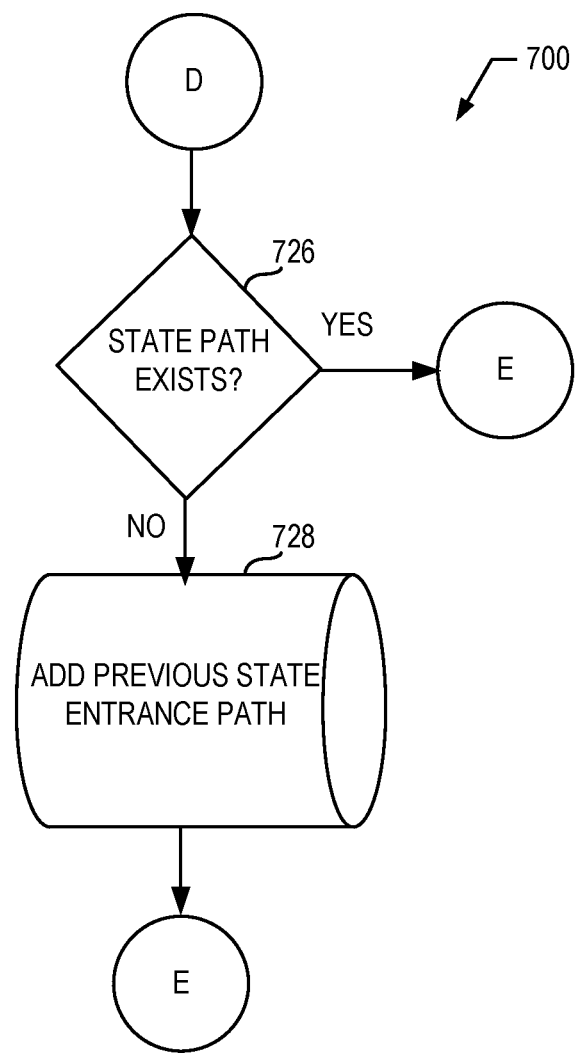
Figure 7E:
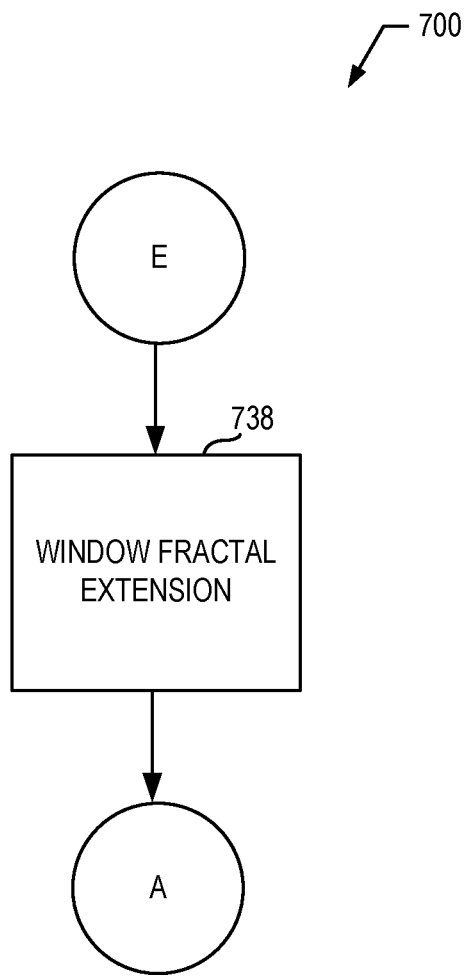

FIG. 6 is a flowchart representative of example machine readable instructions 600 that, when executed, implement the example sampling tuner 305 to begin the observation phase to understand the changing variables, velocity and/or appropriate frequency for data collection. FIG. 6 is an example process to implement block 515 of FIG. 5. The example process 600 of the illustrated example of FIG. 6 begins when the example sampling tuner 305 is initiated. (Block 605).

The sampling tuner 305 then reviews the configuration and capabilities of the device and determines the samples needed for a population of confidence. (Block 610). The sampling tuner 305 choses a sampling rate based on the configuration and capabilities of the device and the number of samples needed for the population of confidence. (Block 615).

The example sampling tuner 305 then samples the telemetry meta data. (Block 620). In this example, the extracted telemetry data can either be a given object or several objects. The sampling tuner 305 then waits for sample cadence. (Block 625). In this example, the example sampling tuner 305 enters an idle sleep of thread for event time. The example sampling tuner then determines if there are enough data points for each object. (Block 630). In order to evaluate the total data points for data extraction as shown in FIGS. 7A-7E, the example sampling tuner 305 needs enough unique sample data points for each object. If the sampling tuner 305 determines there are enough unique data points for each object (e.g., block 630 returns a result of YES), the sampling tuner 305 measures the distance of the Nyquist frequency of the object or set of objects. (Block 635). If the sampling tuner 305 determines here are not enough unique data points for each object (e.g., block 630 returns a result of NO), the sampling tuner 305 returns to block 620 and extracts more telemetry data.

Once the sampling tuner 305 has calculated the distance of the Nyquist frequency, the sampling tuner 305 then determines the necessary sampling rate changes. (Block 640). If the sampling tuner 305 determines the distance between objects is zero (e.g., if block 640 returns a result of YES), then the sampling tuner 305 records the sampling frequency on the object. (Block 650) The example sampling tuner 305 then doubles the frequency to decrease the sampling rate of data object observation. (Block 655). If the sampling tuner 305 determines the distance between objects is not zero (e.g., if block 640 returns a result of NO), then the sampling tuner 305 halves the sampling frequency to increase the sample rate of data object observation. (Block 645).

The example sampling tuner 305 determines if a sampling frequency has been recorded. (Block 660). If the sampling tuner 305 has not recorded a sampling frequency (e.g., block 660 returns a result of NO), then the sampling tuner 305 returns to block 620 to continue to sample telemetry meta data. If the example sampling tuner 305 has recorded a sampling frequency (e.g., block 660 returns a result of YES), the sampling tuner 305 records the sample to a population list. (Block 665).

The example sampling tuner 305 then determines if there are enough samples for to determine the sampling rate within the confidence interval. (Block 670). If the sampling tuner has enough samples for confidence, (e.g., block 670 returns a result of YES), then the sampling tuner 305 aggregates the rate necessary to observe data objects and the appropriate sampling frequency is relayed to the example fault predictor 205. (Block 675). If the sampling tuner 305 does not have enough samples for confidence, (e.g., block 670 returns a result of NO), then the sampling tuner 305 returns to block 615 and choses another random sampling cadence.

FIGS. 7A-7E are flowcharts representative of example machine readable instructions 700 that, when executed, implement the profile extractor 310 to begin meta data profiling and device state machine learning. FIGS. 7A-7E are an example process to implement block 520 of FIG. 5. The example process 700 of the illustrated example of FIGS. 7A-7E begin when the example fault predictor 205 initiates the example profile extractor 310. (Block 702).

The profile extractor 310 then loads the requirement thresholds for observation of one or more sets of object containers. (Block 704). In examples disclosed herein, an object container comprises one or more data objects within an encapsulated form. The requirement thresholds are calculated based on the sampling rate determined by the example sampling tuner 305. The profile extractor 310 then marks the sample start window, indicating the period to start sampling. (Block 706).

The profile extractor 310 then begins recording telemetry data to be stored in the example database 334. (Block 708). In this example, telemetry data includes snapshots of system meta data and time-series telemetry data objects. These data points are collected into a linked object container within the example database 334. The example profile extractor 310 then determines if a state or distance change has occurred. (Block 710).

If the example profile extractor 310 determines a state change has not occurred (e.g., block 710 returns a result of NO), the profile extractor 310 compresses the window sample range. (Block 712). Compression of a period of the window sample range indicates the range start and stop of a continuous value. For a given time series data stream, data processing is optimized by using the matrix profile to extract unique sequence to sequence signatures. Since the velocity of data structures are not uniform, data is collected at the tuned frequency for the highest velocity data then resampled for lower velocity data. For example, thermal component data changes at a rate of $\frac{1}{32}^{nd}$ of a second while the device telemetry snapshot (NVMe) queues operate at $\frac{1}{1,600,000}^{th}$ of a second. Due to the dramatic difference in frequency, metadata is collected for an on the demand basis then data ranges for repetitive values are compressed to reduce the storage footprint of telemetry data collection. The compression of these signatures is encoded into the data base of fractals so an event can be agnostically compared through dynamic time warping these repetitive sequence patterns. The representation of these compressed windows means the minimal sampled data for each data signature with reference for slow or fast occurring events is obtained such that the prediction can be projected to a precise time event index or interval in the future. These prediction and projections are increased in precision, accuracy, and more data is collected such that the artificial neural networks learn the statistical variance such that the dimensionality of a given projection is within the magnitude of the observed events. The profile extractor 310 then waits for data to be recorded. (Block 714). The profile extractor 310 then returns to block 708 and records more telemetry data.

If the example profile extractor 310 determines a state change has occurred (e.g., block 710 returns a result of YES), then the profile extractor 310 extracts the matrix profile. (Block 716). In doing this, the example profile extractor 310 uniquely identifies the current time series signature of linked container. In order to match events, a distance matrix of all pairs of subsequences of length is constructed and the pairs are projected down the smallest non-diagonal value to a vector. In some examples, the matrix profile would be this vector. The profile extractor 310 then searches an example database 334 for similar profiles. (Block 718). In this example, the example database 334 contains a ranked set of profile (or query) matches, each with a quantified amount of similarity to the extracted profile.

The example profile extractor 310 then determines if the example database 334 contains any similar profiles. (Block 720). If the example database 334 contains no similar profiles (e.g., block 720 returns a result of NO), then the profile extractor 310 determines if the extracted profile is a subsequence. (Block 722). If the profile extractor 310 determines the extracted profile is not a subsequence (e.g., block 722 returns a result of NO), the extracted profile is added to the example database 334. (Block 724). If the profile extractor 310 determines the extracted profile is a subsequence (e.g., block 722 returns a result of YES), the profile extractor 310 then determines if a state path exists for that profile. (Block 726). If a state path exists for the extracted profile (e.g., block 726 returns a result of YES), then the example profile extractor 310 performs window fractal extension. (Block 738). Window fractal extension includes extending or compressing the profile set to a desired dimension, indicating the chaos factor as a compression or extension of the self-similarity dimension. If the chaos factor (e.g., roughness, irregularity, etc.) is not indicated, then the extension or compression of the profile set would repeat indefinitely. Thus, the chaos factor is an essential part of the fractal extension of the window. Additionally, statistical data facilitates identifying the compression and expansion of metadata windows such that the relativity of the observed event is preserved for the rate of changes in the meta data. These statistically characterized events create a series of fitting equations with varying coefficient factors such that the basis is preserved for the core algorithmic characterization. Then, the profile extractor 310 returns to block 714 and waits to record telemetry data. If a state path does not exist for the extracted profile (e.g., block 726 returns a result of NO), the profile extractor 310 records the entrance path of the extracted profile. (Block 728). The profile extractor 310 then continues to block 738 to perform window fractal extension.

If the example database 334 contains similar profiles (e.g., block 720 returns a result of YES), the example profile extractor 310 then determines if the similar profile has a common subsequence. (Block 730). If the extracted profile and the similar profile have a common subsequence (e.g., block 730 returns a result of YES), then the profile extractor 310 adds the extracted profile to the database 334 on the previous state tree. (Block 732). Additionally, the example profile extractor 310 determines if a state path exists. (Block 726).

If the extracted profile and the similar profile do not have a common subsequence (e.g., block 730 returns a result of NO), then the example profile extractor 310 determines if there is enough samples within the extracted profile to ensure adequate representation of variance. (Block 740). If there are enough samples in the extracted profile (e.g., block 740 returns a result of YES), then the profile extractor 310 returns to block 706 and indicates a new period of sampling. If there are not enough samples in the extracted profile (e.g., block 740 returns a result of NO), then the profile extractor 310 adds an additional profile to the extracted profile. (Block 742). The example profile extractor 310 continues to block 732 and adds the extracted profile with its additional profile to the database 334 on the previous state tree.

The example profile extractor 310 then re-indexes interval profiles to introduce the new data points. (Block 734). The profile extractor 310 then re-clusters the database 334 to balance the data structure for performance access based on the new data points. (Block 736). The re-clustering technique performs machine-learning techniques to cluster states and entrance paths for similar profiles. The profile extractor 310 then returns to block 738 and performs window fractal extension. According to the illustrated example, the process 700 of FIGS. 7A-7E is then continually repeated. Alternatively, the process 700 may terminate after a singleton set or multiple sets of interactions.

Figure 8:
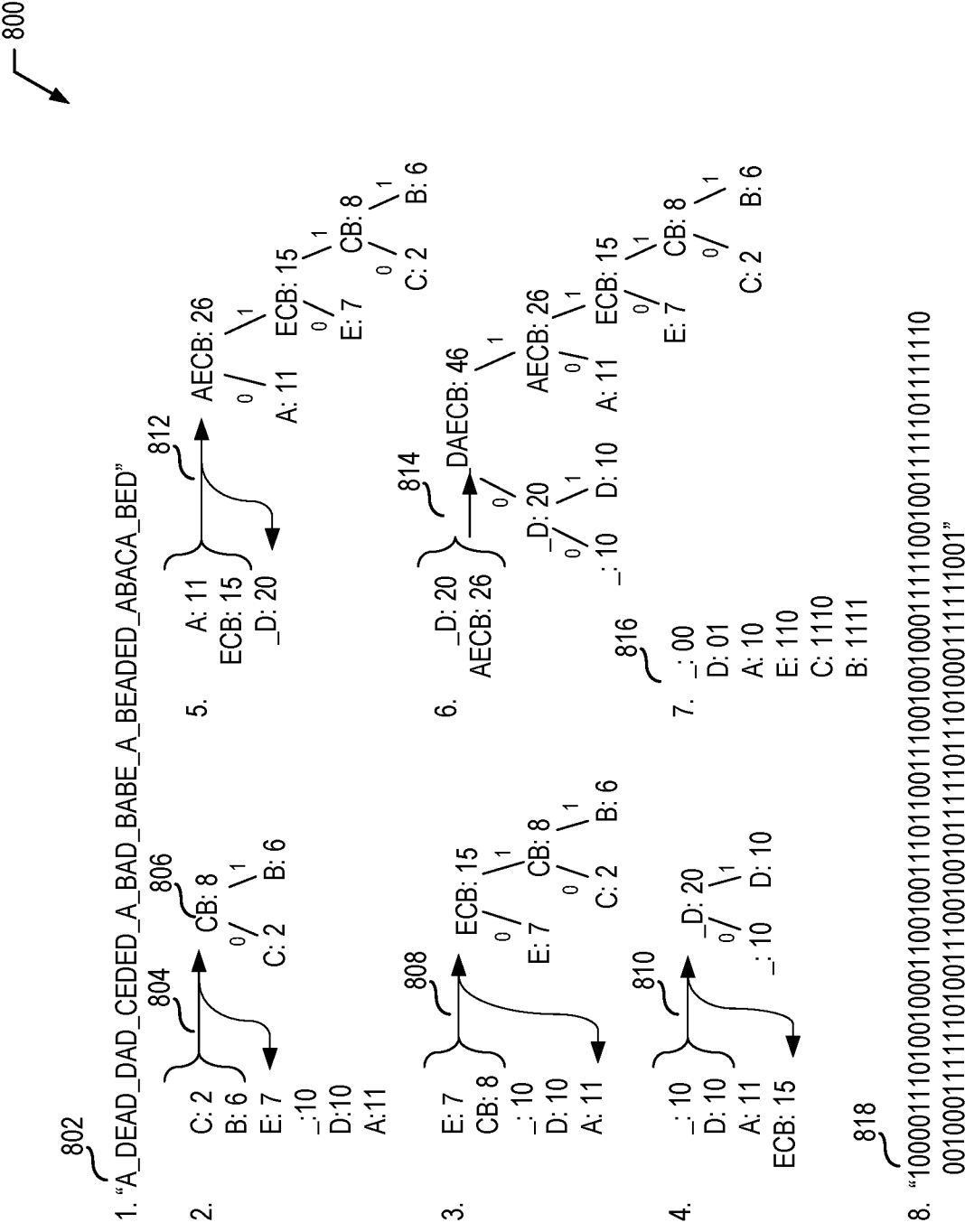
FIG. 8 is a block diagram of an example database encoding scheme in accordance with the machine-readable instructions of FIG. 7A-7E.

FIG. 8 is a flowchart representative of example machine readable instructions 800 that, when executed, implement the profile extractor 310 to encode profiles within the example database 334. The profiles within the database are encoded to lower the required storage needed for the database. The example process 800 of the illustrated example FIG. 8 begins when the profile extractor 310 extracts an example profile. (Block 802).

The profile extractor 310 converts the example profile into a list which indicates the frequency of each item within the example profile. (Block 804). Then the example profile extractor 310 combines two item within the profile to form a string of the two items. (Block 806). In this example, the profile extractor combines the two items with the lowest frequency of occurrence within the example profile. In this example, the string generated by the profile extractor 310 is "CB". The string "CB" has a state tree containing two branches (or fractals) indicative of the frequency of each item within profile (e.g. C:2, B:6). Each branch also has a binary digit to differentiate between the two branches.

The example profile extractor 310 then generates a new list containing the remaining items within the profile and the string generated in block 804. The profile extractor 310 generates a new string and updates the state tree to include the new branches associated with the new string. (Block 808). The profile extractor 310 repeats this generation of strings until all items within the profile are included in a string. (Blocks 810-814).

The example profile extractor 310 then retrieves the binary representation of each item in the string from the state tree. (Block 816). The example profile extractor then stores the example profile within the example database 334. The state trees of the profiles, once stored within the database, are easily searchable through fractal similarity searches.

Figure 9:
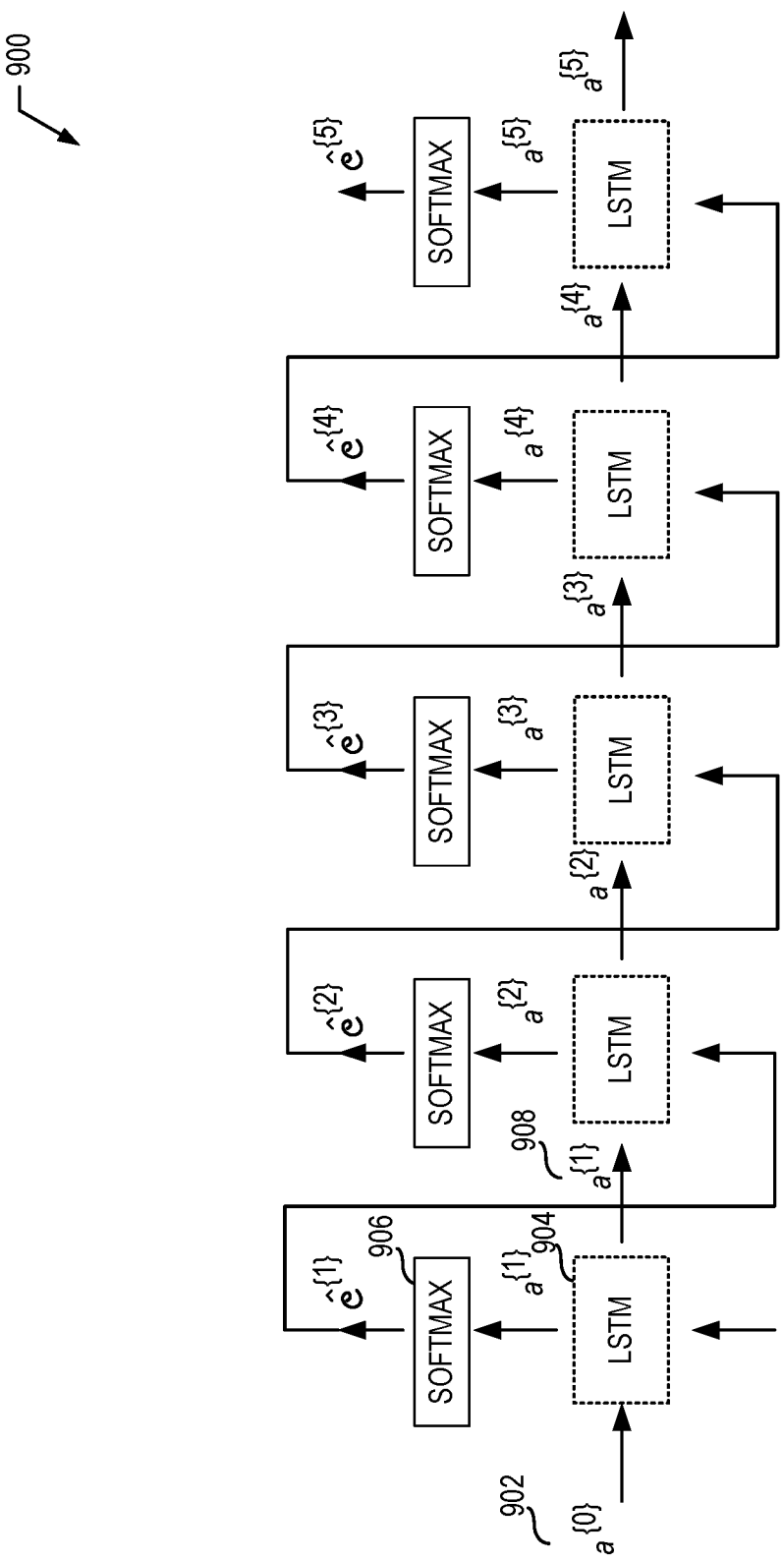
FIG. 9 is a block diagram of an example fractal similarity search query in accordance with the machine-readable instructions of FIG. 7A-7E.

FIG. 9 is a block diagram of an example fractal similarity search query 900 in accordance with the machine-readable instructions of FIGS. 7A-7E. FIG. 9 further illustrates the training of a time series recurrent neural network (RNN). The RNN layer inputs an example input sequence 902 into the example Long Short-Term Memory (LS™) 904 every timestep, and outputs an example variable 908 to be the input for the next timestep LS™. The variable 908 is also fed into an example Softmax 906, which returns a vector that represents probability distributions of potential outcomes. This vector is fed into the next timestep LS™. In this example, the LS™ is acting as the RNN. With the data input stream from example client devices 102, database queries, and encoded trees as mentioned in FIG. 8, the RNN is trained to replicate the fractal map. The RNN is trained for complete streams of data (e.g. Q=Q(1)+Q(2)+Q(3)+Q(4)+Q(5)), time series fractals are removed (e.g. now Q=Q(1)+Q(2)+Q(3)+Q(4), Q(5) is removed) to complete the training of the RNN. The prediction RNN is trained by choosing random sequence inputs as starting points and using the steps shown in FIG. 7A-7E to predict the next steps to determine the full profile of the input. Using LS™ and maximal Softmax to bound the array variance, a generated fractal similarity search query is created based on an input fractal vector is created. In general, the system can predict a full data profile using just a fractional input of data from any point within that profile. Additionally, for focused event identification, auto encoders and decoders are used to reduce the latent space of vectored variables (approximately 1.8 Million in vector width) on large sets of time series metadata.

Once the RNNs contained baseline fractals (e.g., positive outcome state space fractals), the RNNs are trained to understand the entire state space of possibilities by forcing failures at the baselines states at varying rates. In this example, Euclidian Distance, Pearson's Correlation, and Dynamic Time Warping were used as similarity search engines. After full RNN training, the system was able to predict failures at 92% accuracy from a random set of test data. Based on the magnitude and quality of metadata, there has been accuracy of up to 98.3% for component characterization.

Figure 10:
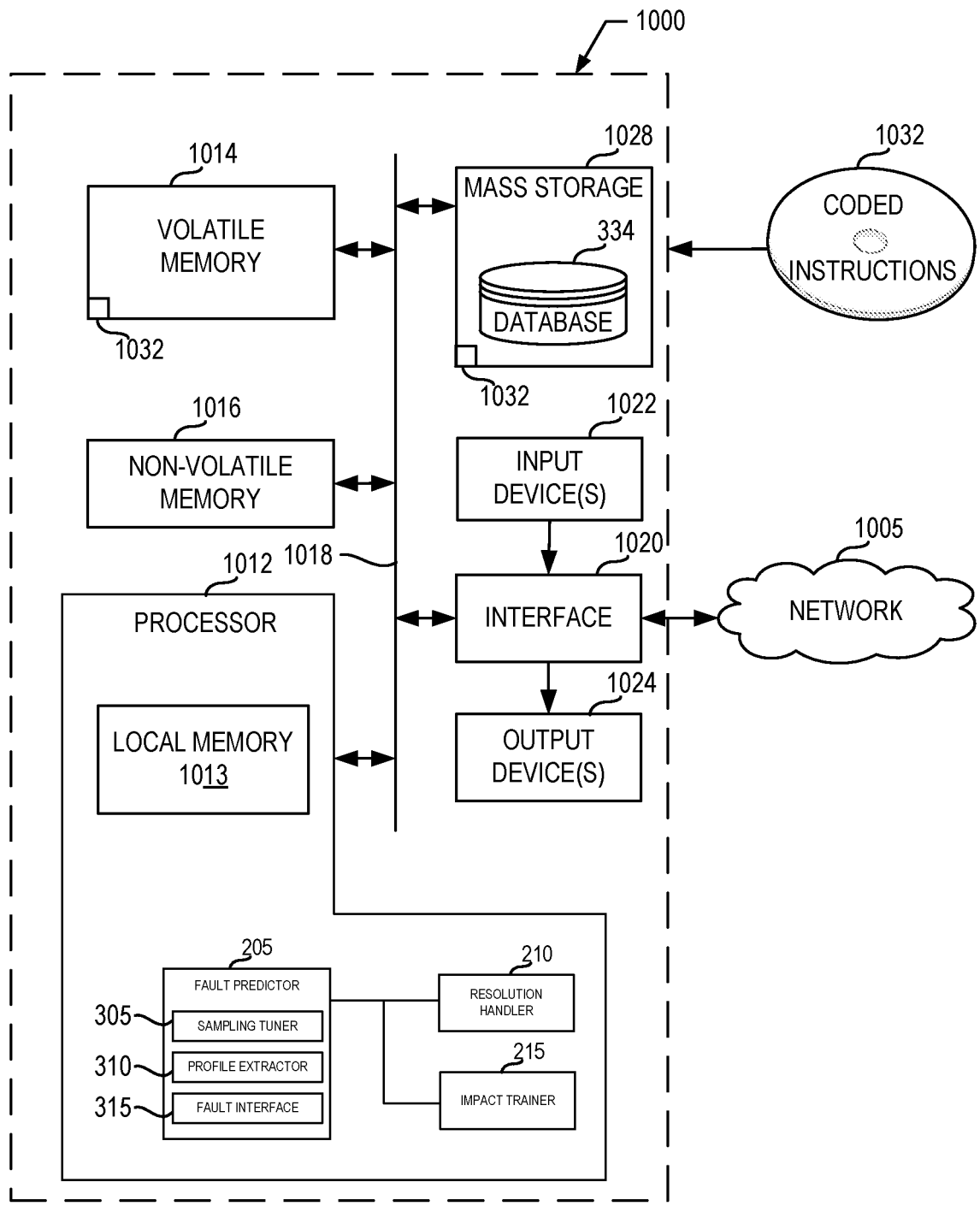
FIG. 10 is a block diagram of an example processing platform structured to execute the instructions of FIGS. 4-7E to implement the telemetry monitor of FIGS. 1, 2, and/or 3.

FIG. 10 is a block diagram of an example processor platform 1000 structured to execute the instructions of FIGS. 4-7E to implement the telemetry analyzer 110 of FIGS. 1, 2, and/or 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example fault predictor 205, the example resolution handler 210, and the example impact trainer 215.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random-Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1005. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In this example, the example mass storage device 1028 includes the example database 334. However, the example database 334 could be included in the example volatile memory 1014, in the example non-volatile memory 1016, and/or on a removable non-transitory computer readable storage medium such as a CD or DVD.

The coded instructions 1032 of FIGS. 4-7E may be stored in the mass storage device 1028, in the volatile memory 1014, in the non-volatile memory 1016, in the local memory 1013, in the database 334, and/or on a removable non-transitory computer readable storage medium such as a CD or DVD. Furthermore, the coded instructions 1032 may correspond to the one or more elements to implement the example telemetry monitor tool 115 described above.

Figure 11:
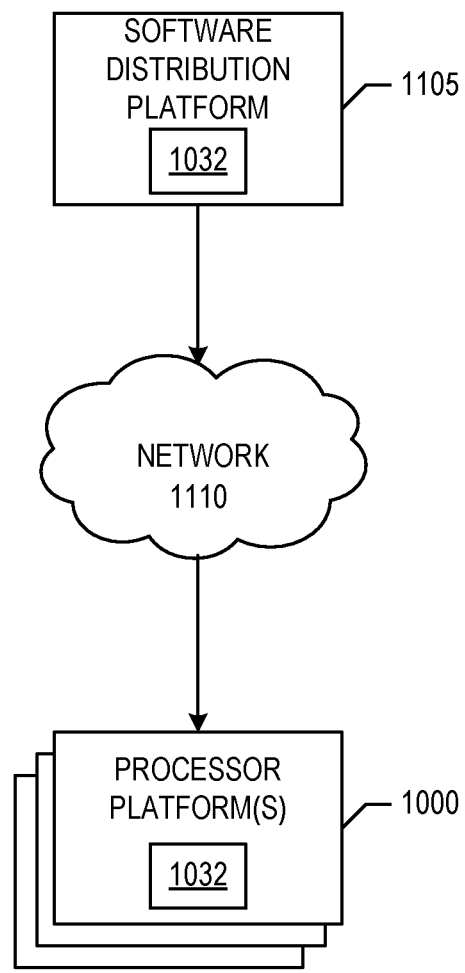
FIG. 11 is block diagram of an example software distribution platform to distribute software (e.g., software corresponding to the example computer readable instructions of FIGS. 4-7E) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1105 to distribute software such as the example computer readable instructions 1032 of FIG. 10 to third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032 of FIG. 10. The third parties may be consumers, users, retailers, OEMs, etc., who purchase and/or license the software for use and/or re-sale and/or sub-licensing. In the illustrated example, the software distribution platform 205 includes one or more servers and one or more storage devices. The storage devices store the computer readable instructions 1032, which may correspond to the example computer readable instructions 115 of FIGS. 1 and/or 2, as described above. The one or more servers of the example software distribution platform 1105 are in communication with a network 1110, which may correspond to any one or more of the Internet and/or any of the example networks 105 and/or 1005 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1032 from the software distribution platform 1105. For example, the software, which may correspond to the example computer readable instructions 115 of FIGS. 1 and/or 2 may be downloaded to the example processor platform 1000, which is to execute the computer readable instructions 1032 to implement the example telemetry analyzer 110. In some example, one or more servers of the software distribution platform 1105 periodically offer, transmit, and/or force updates to the software (e.g., the example computer readable instructions 1032 of FIG. 10) to ensure improvements, patches, updates, etc. are distributed and applied to the software at the end user devices.

From the foregoing, it will be appreciated that example methods, apparatus and articles of manufacture have been disclosed that allow for continuous characterization of execution paths, prediction of outcomes of execution paths, and intervention methods to prevent negative outcomes. The disclosed methods, apparatus and articles of manufacture improve the efficiency of using a computing device by actively predicting and intervening paths of execution that result in negative outcomes. Furthermore, systems that deploy this tool increase its overall efficiency through machine learning of new or improved intervention techniques to prevent these negative outcomes. The disclosed methods, apparatus and articles of manufacture are accordingly directed to one or more improvement(s) in the functioning of a computer.

Example 1 includes an apparatus for monitoring telemetry in a computing environment, the apparatus comprising a fault predictor to predict an outcome of an execution path, a resolution handler to determine a resolution strategy for the execution path, and apply the resolution strategy, and an impact trainer to determine whether the predicted outcome of the execution path has changed, and store impact data of the applied resolution strategy.

Example 2 includes the apparatus of example 1, the fault predictor further to in response to predicting the outcome of the execution path to be a fault, drive an interrupt and provide control parameters to the resolution handler, and in response to the predicted outcome of the execution path no longer being a fault, clear the interrupt.

Example 3 includes the apparatus of example 1, the resolution handler further to in response to determining the resolution strategy exists for the execution path, apply the resolution strategy to the execution path, and in response to determining the resolution strategy does not exist for the execution path, create a resolution strategy list containing resolution strategies in ascending order of system performance cost and apply a first resolution strategy from the list.

Example 4 includes the apparatus of example 3, wherein the impact trainer further to in response to determining the predicted outcome of the execution path has not changed and all resolution strategies from the resolution strategy list have not been attempted, apply a next resolution strategy in the resolution strategy list, in response to determining the predicted outcome of the execution path has not changed and all resolution strategies from the resolution strategy list have been attempted, relay impact data of the resolution strategy to the fault predictor, and in response to determining the predicted outcome of the execution path has changed, relay impact data of the resolution strategy to the fault predictor.

Example 5 includes the apparatus of example 1, the fault predictor further including a sampling tuner to determine an appropriate frequency for data collection.

Example 6 includes the apparatus of example 1, the fault predictor further including a profile extractor to extract and improve profiles to predict the outcome of the execution path.

Example 7 includes the apparatus of example 6, wherein the profile extractor extracts and improves profiles using fractal similarity searches.

Example 8 includes a non-transitory computer readable medium comprising instructions, which, when executed, cause at least one processor to at least predict an outcome of an execution path, determine a resolution strategy for the execution path, apply the resolution strategy, determine whether the predicted outcome of the execution path has changed, and store impact data of the applied resolution strategy.

Example 9 includes the non-transitory computer readable medium of example 8, wherein the instructions, when executed, cause the at least one processor to in response to predicting the outcome of the execution path to be a fault, drive an interrupt and provide control parameters, and in response to the predicted outcome of the execution path no longer being a fault, clear the interrupt.

Example 10 includes the non-transitory computer readable medium of example 8, wherein the instructions, when executed, cause the at least one processor to in response to determining the resolution strategy exists for the execution path, apply the resolution strategy to the execution path, and in response to determining the resolution strategy does not exist for the execution path, create a resolution strategy list containing resolution strategies in ascending order of system performance cost and apply a first resolution strategy from the list.

Example 11 includes the non-transitory computer readable medium of example 10, wherein the instructions, when executed, cause the at least one processor to in response to determining the predicted outcome of the execution path has not changed and all resolution strategies from the resolution strategy list have not been attempted, apply a next resolution strategy in the resolution strategy list, in response to determining the predicted outcome of the execution path has not changed and all resolution strategies from the resolution strategy list have been attempted, relay impact data of the resolution strategy, and in response to determining the predicted outcome of the execution path has changed, relay impact data of the resolution strategy.

Example 12 includes the non-transitory computer readable medium of example 8, wherein the instructions, when executed, cause the at least one processor to determine an appropriate frequency for data collection.

Example 13 includes the non-transitory computer readable medium of example 8, wherein the instructions, when executed, cause the at least one processor to extract and improve profiles to predict the outcome of the execution path.

Example 14 includes the non-transitory computer readable medium of example 13, wherein the instructions, when executed, cause the at least one processor to extract and improve profiles using fractal similarity searches.

Example 15 includes a method comprising predicting an outcome of an execution path, determining a resolution strategy for the execution path, applying the resolution strategy, determining whether the predicted outcome of the execution path has changed, and storing impact data of the applied resolution strategy.

Example 16 includes the method of example 15, further including in response to predicting the outcome of the execution path to be a fault, driving an interrupt and provide control parameters, and in response to the predicted outcome of the execution path no longer being a fault, clearing the interrupt.

Example 17 includes the method of example 15, further including in response to determining the resolution strategy exists for the execution path, applying the resolution strategy to the execution path, and in response to determining the resolution strategy does not exist for the execution path, creating a resolution strategy list containing resolution strategies in ascending order of system performance cost and applying a first resolution strategy from the list.

Example 18 includes the method of example 17, further including in response to determining the predicted outcome of the execution path has not changed and all resolution strategies from the resolution strategy list have not been attempted, applying a next resolution strategy in the resolution strategy list, in response to determining the predicted outcome of the execution path has not changed and all resolution strategies from the resolution strategy list have been attempted, relaying impact data of the resolution strategy, and in response to determining the predicted outcome of the execution path has changed, relaying impact data of the resolution strategy.

Example 19 includes the method of example 15, further including determining an appropriate frequency for data collection.

Example 20 includes the method of example 15, further including extracting and improving profiles to predict the outcome of the execution path using fractal similarity searches.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for monitoring telemetry in a computing environment, the apparatus comprising:
   a fault predictor to predict an outcome of an execution path based on a recurrent neural network performing a fractal similarity search query based on collected telemetry data;
   a resolution handler to:
      determine a resolution strategy for the execution path; and
      apply the resolution strategy; and
   an impact trainer to:
      determine whether the predicted outcome of the execution path has changed; and
      store impact data of the applied resolution strategy.

2. The apparatus of claim 1, wherein the fault predictor is to:
   based on the outcome of the execution path corresponding to a fault, drive an interrupt and provide control parameters to the resolution handler; and
   based on the predicted outcome of the execution path no longer corresponding to a fault, clear the interrupt.

3. The apparatus of claim 1, wherein the resolution handler is to:
   based on the resolution strategy for the execution path being included in a list, apply the resolution strategy to the execution path; and based on the resolution strategy for the execution path not being included in the list, create a resolution strategy list containing resolution strategies in ascending order of system performance cost and apply a first resolution strategy from the resolution strategy list.

4. The apparatus of claim 3, wherein the impact trainer further to:
based on the predicted outcome of the execution path not changing and all resolution strategies from the resolution strategy list not being attempted, apply a next resolution strategy in the resolution strategy list;
based on the predicted outcome of the execution path not changing and all resolution strategies from the resolution strategy list having been attempted, relay impact data of the resolution strategy to the fault predictor; and
based on the predicted outcome of the execution path changing changed, relay impact data of the resolution strategy to the fault predictor.

5. The apparatus of claim 1, wherein the fault predictor is to determine a frequency for data collection.

6. The apparatus of claim 1, wherein the fault predictor is to extract and adjust profiles to predict the outcome of the execution path.

7. The apparatus of claim 6, wherein the fault predictor is to extract and adjust profiles using fractal similarity searches.

8. A non-transitory computer readable medium comprising instructions to cause at least one processor to at least:
predict an outcome of an execution path based on a recurrent neural network performing a fractal similarity search query based on collected telemetry data;
determine a resolution strategy for the execution path;
apply the resolution strategy;
determine whether the predicted outcome of the execution path has changed; and
store impact data of the applied resolution strategy.

9. The non-transitory computer readable medium of claim 8, wherein the instructions cause the at least one processor to:
after predicting the outcome of the execution path to be a fault, drive an interrupt and provide control parameters; and
after the predicted outcome of the execution path is no longer a fault, clear the interrupt.

10. The non-transitory computer readable medium of claim 8, wherein the instructions cause the at least one processor to:
after determining the resolution strategy exists for the execution path, apply the resolution strategy to the execution path; and
after determining the resolution strategy does not exist for the execution path, create a resolution strategy list containing resolution strategies in ascending order of system performance cost and apply a first resolution strategy from the resolution strategy list.

11. The non-transitory computer readable medium of claim 10, wherein the instructions cause the at least one processor to:
after determining the predicted outcome of the execution path has not changed and all resolution strategies from the resolution strategy list have not been attempted, apply a next resolution strategy in the resolution strategy list;
after determining the predicted outcome of the execution path has not changed and all resolution strategies from the resolution strategy list have been attempted, relay impact data of the resolution strategy; and
after determining the predicted outcome of the execution path has changed, relay impact data of the resolution strategy.

12. The non-transitory computer readable medium of claim 8, wherein the instructions cause the at least one processor to determine a frequency for data collection.

13. The non-transitory computer readable medium of claim 8, wherein the instructions cause the at least one processor to extract and adjust profiles to predict the outcome of the execution path.

14. The non-transitory computer readable medium of claim 13, wherein the instructions cause the at least one processor to extract and adjust profiles using fractal similarity searches.

15. A method comprising:
predicting, using a recurrent neural network, an outcome of an execution path based on a fractal similarity search query based on collected telemetry data;
determining, by executing an instruction with programmable circuitry, a resolution strategy for the execution path;
applying, by executing an instruction with the programmable circuitry, the resolution strategy;
determining, by executing an instruction with the programmable circuitry, whether the predicted outcome of the execution path has changed; and
storing impact data of the applied resolution strategy.

16. The method of claim 15, further including:
after predicting the outcome of the execution path to be a fault, driving an interrupt and provide control parameters; and
after the predicted outcome of the execution path is no longer being a fault, clearing the interrupt.

17. The method of claim 15, further including:
after determining the resolution strategy exists for the execution path, applying the resolution strategy to the execution path; and
after determining the resolution strategy does not exist for the execution path, creating a resolution strategy list containing resolution strategies in ascending order of system performance cost and applying a first resolution strategy from the resolution strategy list.

18. The method of claim 17, further including:
after determining the predicted outcome of the execution path has not changed and all resolution strategies from the resolution strategy list have not been attempted, applying a next resolution strategy in the resolution strategy list;
after determining the predicted outcome of the execution path has not changed and all resolution strategies from the resolution strategy list have been attempted, relaying impact data of the resolution strategy; and
after determining the predicted outcome of the execution path has changed, relaying impact data of the resolution strategy.

19. The method of claim 15, further including determining a frequency for data collection.

20. The method of claim 15, further including extracting and adjusting profiles to predict the outcome of the execution path using fractal similarity searches.

* * * * *